Oct. 28, 1941.　　　H. F. UNSINGER　　　2,260,422
MILK BOTTLE CREAM SEPARATOR
Filed Jan. 30, 1940
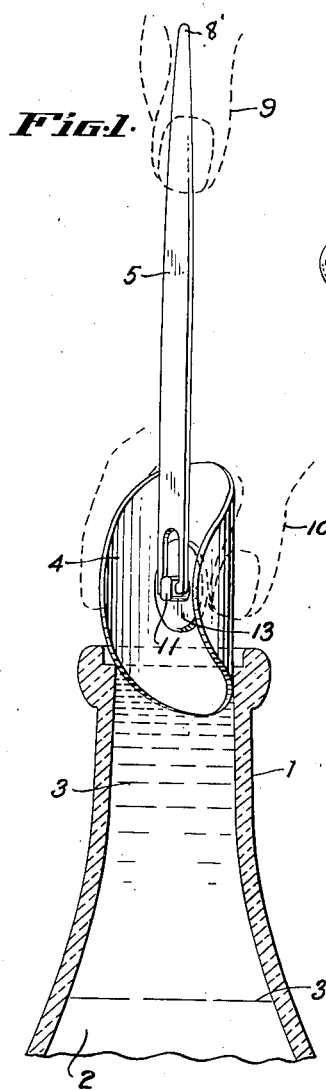
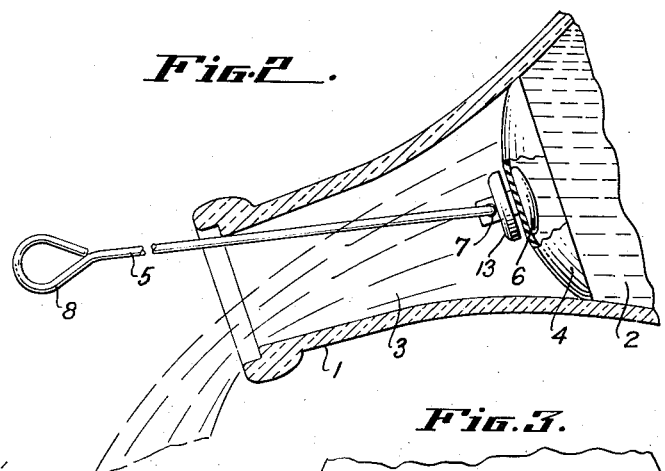
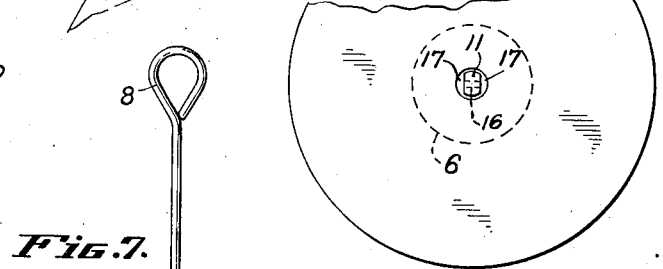
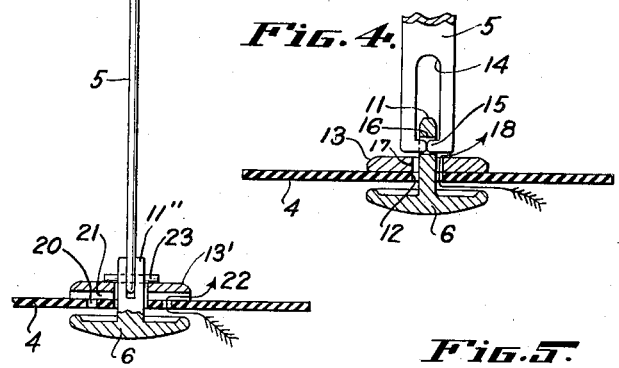
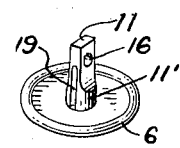
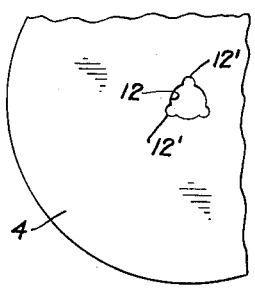
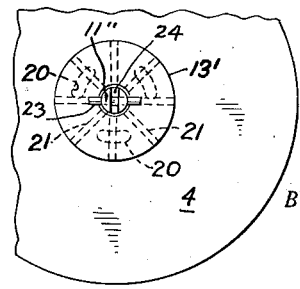
INVENTOR.
HAROLD F. UNSINGER
BY
ATTORNEY Patented Oct. 28, 1941

2,260,422

UNITED STATES PATENT OFFICE 2,260,422

MILK BOTTLE CREAM SEPARATOR

Harold F. Unsinger, San Francisco, Calif.

Application January 30, 1940, Serial No. 316,356

2 Claims. (Cl. 210—51.5)

This invention relates to devices for facilitating the separation of and removal of cream from milk in an ordinary milk bottle, and the object of the invention is to provide improvements in such devices which will simplify the operations involved in its use. The invention constitutes a specific improvement on the type of milk bottle cream separating device shown in my U. S. Patent No. 1,987,037 of January 8, 1935.

In the drawing:

Fig. 1 shows my improved cream separator being collapsed and lowered into the open mouth of a standard milk bottle.

Fig. 2 shows the position of the device and bottle when the separated cream is being poured off.

Fig. 3 is an enlarged plan view of the flexible disk of my device showing the air vent alongside the shank of the disk retaining button.

Fig. 4 is a somewhat enlarged vertical sectional view of the central portion of the disk showing the lower end of the handle and its attachment to the retaining button in a manner to function as a valve.

Fig. 5 is a detached perspective view of a modified form of retaining button with a venting groove formed along the side of its shank.

Fig. 6 is a plan view of the central portion of the flexible disk showing a modified form of opening through it to receive a plain round shank of a retaining button and yet provide venting passages alongside the shank.

Fig. 7 is a view similar to that of Fig. 4 but showing a modified arrangement for opening venting passages through the central portion of the disk when the handle of the disk is pushed downwardly.

Fig. 8 is a plan view of Fig. 7 with the handle removed.

Before describing the present improvement attention is called to the fact that the device consists generally of a round flexible (rubber) disk pivotally attached to an elongated handle. The disk is of a size to fit tightly within the bottle at a point where the tapered bottle neck enlarges to the full diameter of the bottle, and just below the usual cream line of the milk. And in use the disk is drawn upward by the handle to form a tight fit within the bottle just below the cream so that the latter may be readily poured off.

In such devices, as the flexible rubber disk is larger than the upper open end of the bottle it manifestly must be collapsed and introduced into the bottle edgewise until it is below the cream line and it straightens out to a position extending transversely within the bottle before it is lifted by the handle, and after the cream is poured off the disk must be again pushed downwardly and collapsed against the side of the bottle for withdrawing edgewise in the same general manner as it was first introduced.

Such milk bottle cream separators have been the subject of several prior patents, and my own prior patent above mentioned introduced the feature of an air vent or rather liquid vent from the under side of the disk to the upper side, and which vent could be opened or closed by turning the handle relative to the disk. This vent was for the purpose of permitting the disk to be pushed back into the body of the milk after the cream had been poured off without the danger of splashing the milk out of the bottle.

The present improvement overcomes the necessity of turning the handle relative to the disk in order to open or close the vent through the disk, and makes the opening and closing of the vent an automatic function of using the device. That is, when pushing down upon the handle the vent is automatically opened, and when pulling upward on the handle to bring the disk into position under the cream the vent automatically closes. After the cream has been poured off and it is again desired to push the disk downward into the body of the milk for collapsing the same against the wall, the vent automatically opens due to the downward movement of the handle relative to the disk and thus permits the milk to surge through it to facilitate the downward movement of the disk. The action being entirely automatic requires no instructions to a user, and cannot fail in operation.

Generally described the invention may be said to consist in connecting the lower end of the handle to the central portion of the disk by means of a button pivotally connected by its shank to the handle in such a manner as to be slidable up and down through the opening in the disk to a limited extent to close off a vent hole through the disk when slid upwardly and to open the vent hole when slid downwardly. The sliding up and down of the button being effected by merely pulling upwardly and pushing downwardly upon the handle when the disk is in the milk bottle.

In Figs. 1 and 2 the milk bottle is designated 1, the milk 2, the cream 3, the cream line 3', the flexible separating disk of my device 4, its elongated handle 5, the button connecting it to the lower end of the handle 6, the pivotal connection 7.

The upper end of the handle may be formed with a loop 8, or may be flat with its extreme end 8' pointed for use in prying up a milk bottle cap. The handle is held by the fingers 9 of a user as shown in Fig. 1, and when inserting the disk 4 it is preferably collapsed with the fingers 10 of the other hand and shoved down while being pressed against the inner wall of the bottle. After pushing down below the cream line into the large part of the bottle the disk is permitted to swing to the horizontal position with the handle 5 centrally within the neck and the handle is then drawn upward until the disk fits tightly within the neck below the cream, and after which the handle is tipped over toward one side of the neck as indicated in Fig. 2 while the cream 3 is poured out.

In Fig. 4 the connecting button 6 is shown in cross section and it is seen to have a rather large round disk-like head preferably slightly cupped on its upper surface to form a rim contact at its periphery with the lower side of the disk 4 when the button is lifted. The button has a shank 11 extending upwardly through a free fitting hole 12 in the disk and it also passes freely through a washer 13 positioned on the upper side of the disk and projects somewhat above it as indicated. The shank 11 as shown in Figs. 3 and 4 is oblong in cross section but with sharp corners removed and is pivotally connected with the handle 5 by any suitable means, though here shown as by bifurcating the lower end of the handle as at 14 and forming confronting pivot lugs 15 on its lower ends which are sprung into a suitable pivot hole 16 extending laterally through the flattened or oblong shank of the button. The handle may be of metal if desired, though I prefer to use a flat strip of any of the modern plastics which permit of being softened and sprung into place in the manner described, or at the time of manufacture.

By the arrangement described for Figs. 3 and 4 it will be seen that a crescent space 17 is formed on both sides of the shank, by reason of the round hole in both the washer 13 and in the disk 4, and that when the button 6 is depressed below the lower surface of the disk 4 as shown in Fig. 4 there will be two clear passageways through these crescent spaces 17 extending from the lower side of the disk to the upper end as denoted by the arrow 18. It is also evident from looking at Fig. 4 that when the handle 5 is pulled upwardly relative to the disk 4 the button 6 will seat tightly at its rim against the lower side of the disk 4 and form a closing valve to shut off the passageways 17, and conversely when the handle is pushed downwardly to position shown in Fig. 4 these passageways will be opened.

Instead of making the shank of the button 6 of oblong cross section clear to the point of its juncture with the head of the button for the purpose of providing the passageways 17 it is manifest that the shank of the button may be round to fit freely in the hole 12 of the disk, but that the latter may have several notches as at 12' in Fig. 6 to form the venting aperture. In this case, of course, the hole in the washer 13 will simply have to be very free to permit venting from these notches 12' to the upper surface of the washer.

As a further modification, the shank 11 of the button may be round at its base at 11' and be provided with venting groove as at 19 channeled out of the edges of the shank as indicated in Fig. 5.

As a further modification of the venting arrangement reference is made to Figs. 7 and 8 and wherein the disk 4, besides having the central aperture for the shank of the button is provided with one or more slots 20 within the diameter of the button 6 so as to be closed off when the button is in contact with the lower side of the disk. In this case the washer at the upper side of the disk, here designated 13', is formed with slight elevating ribs 21 on its under surface so that the slots 20 will vent outward through the space formed by these ribs as indicated by the arrow 22. In this showing the handle 5 is a flat strip which enters a central slot 24 in the shank 11" of the button and is pivoted thereto by a transversely extending pivot 23, and which pivot forms an abutment against the upper washer 13' when the handle is pushed downward to force the disk down into the milk after pouring off the cream.

In the showing of Fig. 4 the lower end of the handle 5 itself forms the abutment which forces the washer 13 into disk 4 downward when releasing the disk from the position of Fig. 2. It being understood, of course, that the milk bottle 1 is first stood upright. And as the disk is forced downwardly into the milk to break the suction seal produced at its edges, it is pressed over to the side of the bottle to flatten it thereagainst and withdrawn from the bottle edgewise in the same general manner as was used in inserting it and as indicated in Fig. 1.

By having the handle 5 formed of a flat strip of material as shown in Figs. 1, 2 and 4 it holds the axis of the pivoting of the handle to the shank of the button 6 in the same plane as the plane of the strip, and hence automatically keeps it in proper position for swinging the handle over to one side as shown in Fig. 2, for the reason that the normal gripping of such a flat handle by a user would be from the opposite flat sides. This provision obviates the use of a universal connection instead of the plain pivoted joint.

From a consideration of my improvement as above described, it will be seen that it in effect forms a venting valve at the juncture of the handle and flexible disk which automatically opens a venting passage through the disk when the handle is pushed downwardly to force the disk down into the milk, and automatically closes the vent as the handle is pulled upward. Thus doing away with the requirement of revolving the handle back and forth relative to the disk as was necessary in my former patent, and thereby greatly simplifying the use of the device.

I claim:

1. In a milk bottle cream separator of the type having an elongated rod handle with a flexible disk at one end of a diameter to fit tightly within the tapering neck of the bottle under the cream with the handle projecting out of the mouth of the bottle, the improvement which comprises a venting passage adjacent the center of the disk extending from the under to the upper side of said disk, and a button having a head arranged to bear against the lower side of said disk to close off said venting passage, and the head provided with a shank slidably projecting through said disk and to which shank said handle is connected, said shank being of a length to provide vertical sliding movement of the shank of the button for uncovering said venting passage when the shank is slid downwardly, and means on said shank limiting the downward sliding movement of said handle relative to said disk while maintaining the vent passage open.

2. In a construction as set out in claim 1, means pivotally connecting said handle to said shank, and said handle being a flat strip of material.

HAROLD F. UNSINGER.